United States Patent [19]

Frieberg

[11] Patent Number: 4,793,752
[45] Date of Patent: Dec. 27, 1988

[54] DRIVE-HEAD LOCK WASHER

[75] Inventor: Bengt O. Frieberg, Laguna Niguel, Calif.

[73] Assignee: Perma-Tite AB, Sweden

[21] Appl. No.: 48,235

[22] Filed: May 11, 1987

[51] Int. Cl.⁴ .............................................. F16B 39/24
[52] U.S. Cl. ..................... 411/161; 411/185
[58] Field of Search ................................ 411/160–165, 411/149, 150, 185, 188

[56] References Cited

U.S. PATENT DOCUMENTS

| 292,063 | 1/1884 | Shailer | 411/150 X |
|---|---|---|---|
| 308,562 | 11/1884 | Jordan | 411/161 |
| 1,824,991 | 9/1931 | Gribbie | 411/165 |
| 3,101,763 | 8/1963 | McGehee | 411/163 X |
| 3,417,802 | 12/1968 | Oldenkott | 411/144 X |
| 3,802,475 | 4/1974 | Gerlach | 411/163 |
| 3,926,237 | 12/1975 | Enders | 411/165 X |
| 4,034,788 | 7/1977 | Melone | 411/165 X |
| 4,134,438 | 1/1979 | Frieberg et al. | 411/163 |
| 4,223,711 | 9/1980 | Tabor | 411/185 X |
| 4,283,091 | 8/1981 | Enders | 411/160 X |
| 4,290,469 | 9/1981 | Nakae | 411/185 |
| 4,310,272 | 1/1982 | Rich et al. | 411/185 |
| 4,377,361 | 3/1983 | Frieberg | 411/164 X |
| 4,490,082 | 12/1984 | Barth | 411/185 |
| 4,518,294 | 5/1985 | Barth | 411/188 |

FOREIGN PATENT DOCUMENTS

| 1170198 | 5/1964 | Fed. Rep. of Germany | 411/161 |
|---|---|---|---|
| 553940 | 2/1923 | France | 411/161 |
| 1003670 | 11/1951 | France | 411/149 |
| 246429 | 9/1947 | Switzerland | 411/161 |
| 6425 | of 1888 | United Kingdom | 411/161 |
| 1361 | of 1890 | United Kingdom | 411/161 |

*Primary Examiner*—Lloyd A. Gall
*Attorney, Agent, or Firm*—Francis X. LoJacono

[57] ABSTRACT

There is provided a flanged drive-head lock washer for use in combination with a wedge-action-type fastener, wherein the fastener includes a bolt or screw member having a cam nut or cam head. The flanged drive-head washer is formed having a nut-like body and a plurality of wrench-engaging sides to match the sides of the particular nut or head of a bolt. The upper face of the washer comprises a plurality of cam members arranged to lockingly engage the corresponding cam surface formed on the contacting surface of the cam nut or cam head. The lower surface of the washer is formed having a frictional surface defined by an enlarged annular flange. The matching cam surfaces are arranged to align the corresponding wrench-engaging side walls, whereby the cam nut or cam head can be simultaneously rotated during removal of the fastener without affecting the integrity of the fastener.

8 Claims, 2 Drawing Sheets

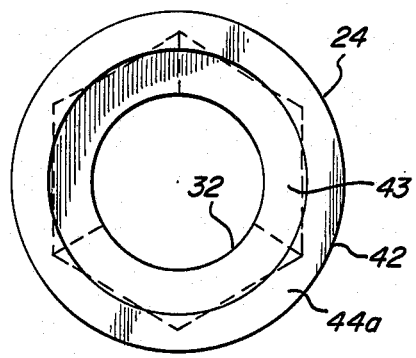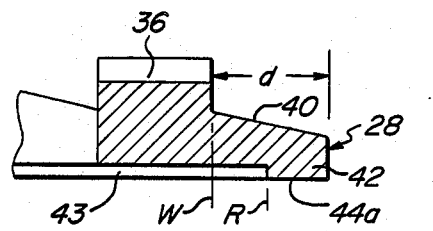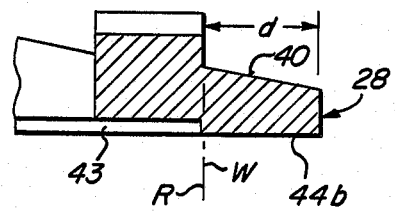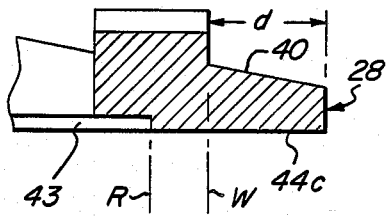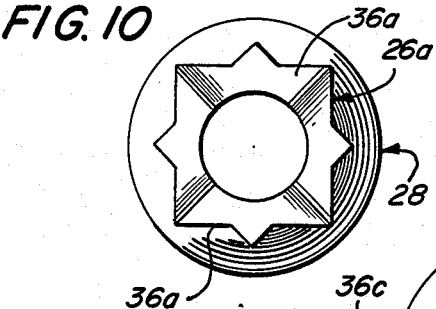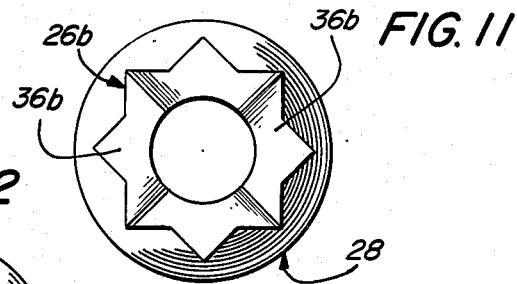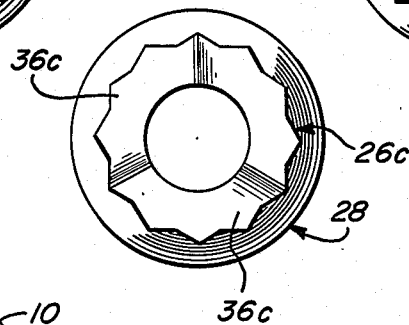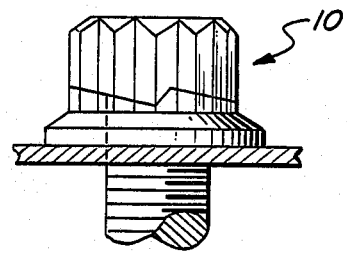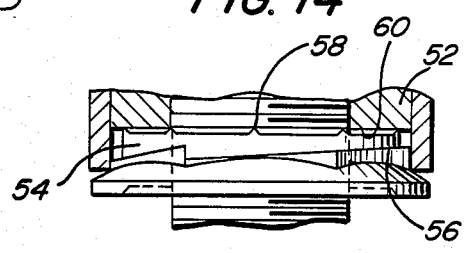

DRIVE-HEAD LOCK WASHER

BACKGROUND OF THE INVENTION

1. Field of the Invention

The present invention relates generally to nut-and-bolt-type fasteners, and more particularly to a lock washer having an engaging cam surface disposed on a drive head, and an opposite frictional surface defined by an enlarged annular flange.

2. Description of the Prior Art

Various problems and difficulties are encountered in providing suitable lock washers of the cam-action type that will allow for simple means to unfasten associated fastening devices. When a known lock washer is installed and tightened with the cam face of the washer engaging under the head of a cam screw, the friction between the frictional surface of the washer and the joint material will prevent the washer from turning, if the cam screw is forced to turn in the loosening direction by vibrational forces or intentionally by the use of a wrench. Accordingly, the rise of the washer cams together with the cam screw is greater than the rise of the threads on the screw shaft. Thus, the cam is liable to turn in the loosening direction by vibrational forces, causing it to slide up the cam surfaces of the interacting washer, of the cam head of the screw or bolt. This cam movement induces a wedging action that jams the nut of the screw or bolt tightly between the threads on one side and the joint via the washer o the other side. Hence, when the cam screw is loosened by a wrench, the cams will override the tops of one another, which causes the bolt to become elongated. Such stretching of the bolt can also permanently damage it, if it is stretched beyond its elastic limit into the plastic region. If the fastener is repeatedly disassembled and reassembled under the cam-overriding effect, it will eventually reach its breaking point and result in a fastener failure. The risk of fastener failures caused by repeated loosening by cam-overriding severely limits the employment of wedge-action lock washers, particularly for cap-screw applications, which often involves the use of short clamp lengths.

As an example of the known art, there is disclosed in U.S. Pat. No. 3,417,802 to Oldenkott a captive lock-washer assembly which comprises a lock washer having a plurality of flat sides, and a cam surface formed on one side and a teeth-engaging surface on the opposite side. The body is designed so that the washer is extremely thin which entails the use of a minimum amount of metal in the fabrication process.

SUMMARY OF THE INVENTION

The present invention has for an important object to provide a flanged drive-head lock washer with a central drive head having a cross-sectional configuration to match that of various commercially available nut-and-screw-head configurations, such as hex, six-point, eight-point, ten-point, twelve-point and torx heads.

Another object of the invention is to provide a flanged drive-head washer having an enlarged flange so as to establish a greater frictional area when engaging the associated workpiece.

Still another object of the invention is to provide a drive-head lock washer having an annular, enlarged-diameter, flange member that defines an extended moment arm of friction long enough to prevent the washer from turning in the loosening direction when subjected to vibrational forces.

A further object of the present invention is to provide a washer of this character wherein the washer includes two integral body members—one being the enlarged friction flange and the other being the drive head having a suitable configuration to match a drive socket—so that the washer is forced to turn together with the nut or cap screw as it is loosened, instead of being subject to cam-overriding which may cause damage to the fastener.

A still further object of the invention is to provide a washer of this type that is simple and relatively inexpensive to manufacture, so that it can be formed having a drive head that will match any given socket or box-wrench-tool configuration, and the configuration of the associated bolt head, screw head, or nut with which it is to be used.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 6 is a bottom-plan view of the lock washer wherein the frictional surface of the annular flange is substantially flat;

FIG. 7 is an enlarged cross-sectional view taken across one section of the washer wherein the annular flange has a small radial surface for greater flexibility between the drive head and the workpiece;

FIG. 8 is a cross-sectional view similar to FIG. 7, showing another form of the annular flange;

FIG. 9 is still another cross-sectional view similar to FIGS. 7 and 8, showing still another flange arrangement;

FIGS. 10, 11 and 12 illustrates three alternative drive-head configurations;

FIG. 13 is an elevational view of a twelve-point screw and a matching drive-head flanged washer; and FIG. 14 is a partial cross-sectional view showing the present invention accommodating a second washer member engaging the nut of a fastener.

DESCRIPTION OF THE PREFERRED EMBODIMENT

Figure 1:
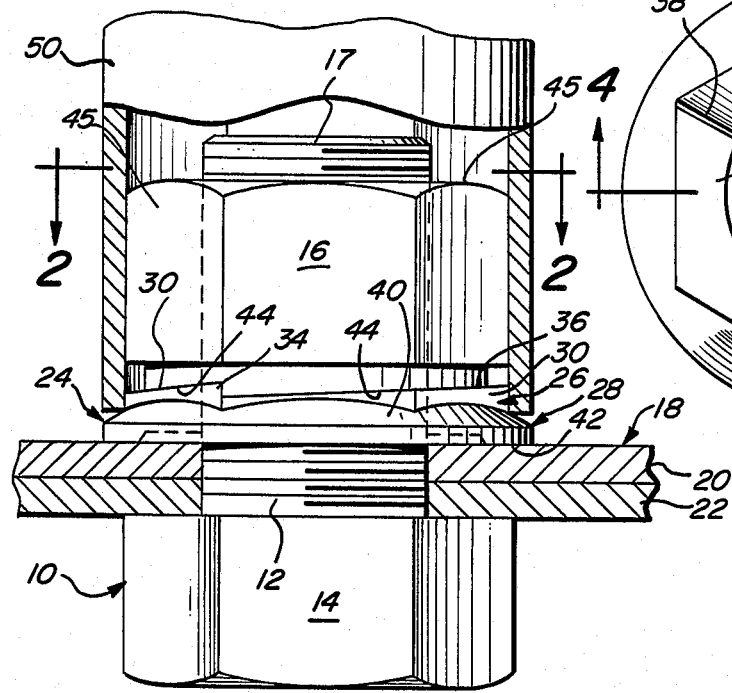
FIG. 1 is an enlarged side-elevational view of the flanged drive-head lock washer in a locked arrangement with a fastening means wherein the nut thereof is formed having an engaging cam surface, and further showing a drive socket in a partial section and the fastener assembly being secured to a workpiece.
Figure 3:
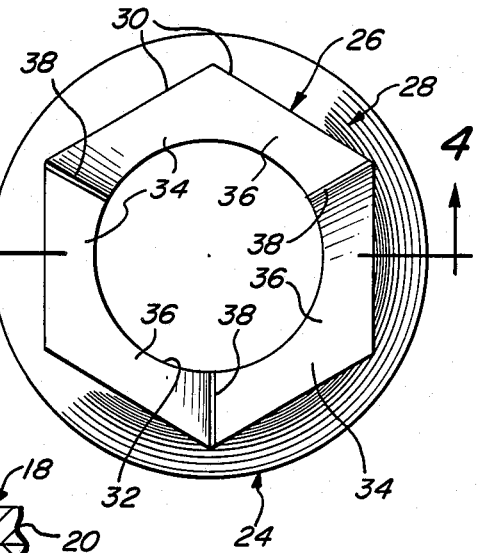
FIG. 3 is a top-plan view of the flanged-head lock washer.

Referring more particularly to FIG. 1, there is shown a fastener means, generally indicated at 10, which comprises a typical threaded bolt or screw 12 having a hexagonal head 14 and a matching hexagonal nut member 16 threaded to the bolt stud 17, the fastener 10 being secured to a workpiece 18 defined by members 20 and 22.

However, according to the following detailed description of the invention, it will be readily understood that the configuration of the present invention, a flanged drive-head lock washer (designated at 24), can be suitably altered to accommodate the various fasteners having other head and nut shapes, such as found in six, eight and twelve-point screws.

The flanged drive-head lock washer 24 comprises two integrally formed body members, one being defined by a drive-head member 26 and the other being defined by an annular, enlarged, washer flange 28. Drive head 26 is shown in FIGS. 1 through 6 as having the general configuration of the typical hexagonal bolt or screw, wherein the drive head is formed having six contiguous wrench-engaging sides or surfaces 30. The drive head is further provided having a central bore 32 through which the bolt or screw stud 17 is received.

The upper engaging surface of drive head 26 is formed having a plurality of contiguous cam members 34 (illustrated as having at least three cam members), each cam member being defined by an inclined cam surface 36 and a substantially vertical or slightly inclined front face member 38.

Washer flange 28 extends radially outward from the lower portion of drive head 26, so as to project the moment arm of the downward locking force as the fastener is secured to the workpiece. The upper surface 40 of flange 28 is formed in an inclined manner, so that it is tapered downwardly and outwardly from drive head 26, as illustrated in FIGS. 4, 7, 8 and 9.

The undersurface of flange 28 defines a friction ring 42 which can vary in size and arrangement, depending upon the diameter of the inner recess 43, which will hereinafter be described. Thus, the undersurface of friction ring 42 comes in direct engagement with the opposing surface of the workpiece, as seen in FIG. 1.

Figure 4:
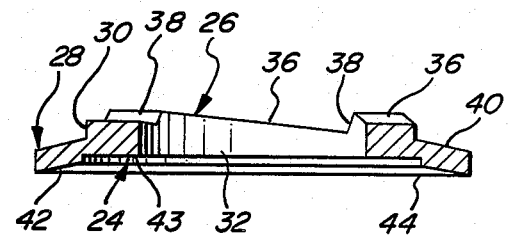
FIG. 4 is a cross-sectional view of the present invention taken substantially along line 4—4 of FIG. 3.
Figure 2:
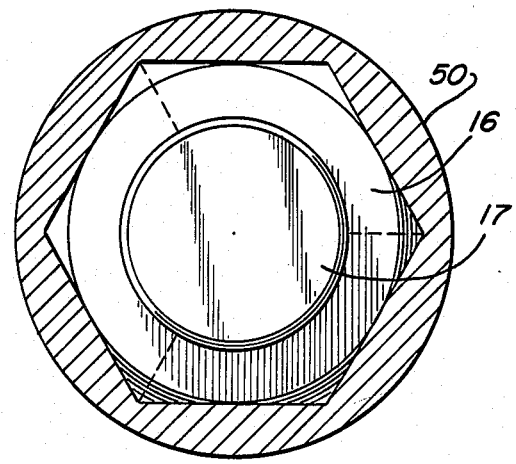
FIG. 2 is a cross-sectional view taken substantially along line 2—2 of FIG. 1.
Figure 5:
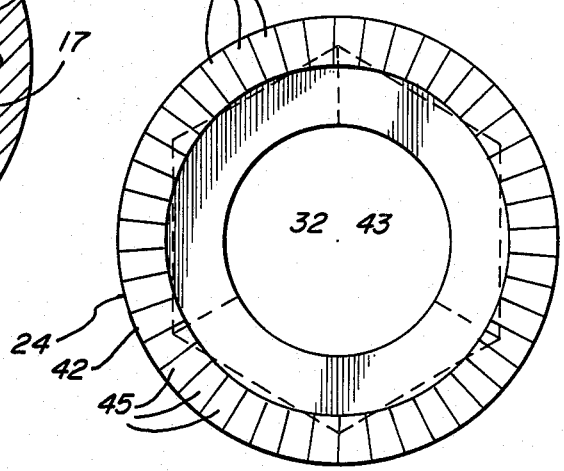
FIG. 5 is a bottom-plan view of the lock washer wherein the frictional surface of the annular flange is shown having radial teeth formed therein.

In FIG. 4 flange 28 is shown provided with a ring 42 having an inclined frictional surface 44 which allows various degrees of contact between frictional surface 44 and the surface of the workpiece 18. The degree of contact depends upon the degree of the securing force of the fastener. For example, the greater the downward securing force, the larger the area of the surface 44 that contacts the workpiece as the frictional ring flexes to a flat configuration.

Other frictional-ring variations are used under specific conditions, such as when the washer is used with a soft material versus its use with a very-hard-surface material. Accordingly, in FIG. 7 the friction ring 44a is formed along the outer edge of flange 28 wherein recess 43 has a diameter greater than the width of the drive head. That is, the radius "R" of recess 43 extends outwardly from the side wall indicated by line "W". The width of the frictional ring 44a is less than the width "d" of flange 28. FIG. 9 illustrates recess "R" as being located inwardly of wall "W". Hence, frictional ring 44c has a greater frictional surface than width "d" of flange 28.

With further reference to frictional ring 42, it is contemplated that a plurality of equally spaced radial teeth 45 can be incorporated to provide additional frictional means between the washers and the workpiece.

FIGS. 10 and 11 illustrate two types of common eight-point drive heads 26a and 26b having cam surfaces 36a and 36b, respectively. FIG. 12 illustrates a flanged lock washer having a twelve-point drive head 26c and cam surfaces 36c. FIG. 13 further shows a fastener 10 having a twelve-point match with a twelve-point flanged lock washer.

Referring again to FIG. 1, it can be readily seen that nut 16 is locked in aligned wall-to-wall relationship to lock washer 24, whereby socket wrench 50 is mounted over nut 16 and drive head 26. This then allows both the nut and the washer to be rotated together and removed from the threaded stud 17, without causing damage to the fastener.

An alternative arrangement or use is also contemplated, such as illustrated in FIG. 14 wherein a typical nut 52 is employed and includes a suitable cam-lock washer 54 having a cam surface 56 and a friction surface 58 to engage the undersurface 60 of nut 52, rather than a single cam nut as shown in FIG. 1.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A wedge-action lock washer in combination with a threaded fastener, comprising:
   a fastener means having a threaded stud member, a fastener head formed at one end thereof, and a nut adapted to be threaded to said stud member, said fastener-head and said nut being formed having a plurality of wrench-engageable vertical side surfaces, wherein one surface of said nut includes a plurality of contiguous cam members;
   a one-piece wedge-action lock washer having a first body portion and an integrally formed second body portion, each of said body portions having a center bore disposed therethrough; said first body portion being formed to define a drive head having a plurality of contiguous cam members adapted to engage said cam members of said nut in a locking arrangement under force, and a plurality of wrench-engageable vertical side surfaces being formed to match and be aligned with said vertical side surfaces of said nut thereof; and said second body portion being defined by an enlarged radially extending flange member, said flange member having a substantially flat frictional engaging surface adapted to engage the surface of a workpiece to which is secured said threaded fastener.

2. The combination as recited in claim 1, wherein said flange member includes a frictional-engaging ring member defined by a central recess formed in the undersurface of said second body portion.

3. The combination as recited in claim 2, wherein said cam members of said nut and said cam members of said drive head, are respectively disposed so as to engage each other, thereby establishing a juxtaposed alignment of said vertical side surfaces thereof.

4. The combination as recited in claim 3, including a socket wrench having a vertical engaging inner side surface adapted to be received over both said fastener head or nut, and said drive head of said lock washer, whereby said lock washer can be rotated simultaneously with said nut of said fastener.

5. The combination as recited in claim 3, wherein the engaging surface of said friction ring of said flange member is selectively determined by the diameter of said recess.

6. The combination as recited in claim 5, wherein said recess is formed having a diameter greater than the width of said drive head.

7. The combination as recited in claim 5, wherein said recess is formed having a diameter equal to the width of said drive head.

8. The combination as recited in claim 5, wherein said recess is formed having a diameter less than the width of said drive head.

* * * * *